United States Patent
Zhang et al.

(10) Patent No.: US 12,452,906 B2
(45) Date of Patent: Oct. 21, 2025

(54) METHOD AND APPARATUS FOR CHANNEL ACCESS

(71) Applicant: Lenovo (Beijing) Ltd., Beijing (CN)

(72) Inventors: Yu Zhang, Haidian District (CN); Haipeng Lei, Haidian District (CN); Alexander Golitschek Edler von Elbwart, Darmstadt (DE)

(73) Assignee: Lenovo (Beijing) Ltd., Beijing (CN)

( * ) Notice: Subject to any disclaimer, the term of this patent is extended or adjusted under 35 U.S.C. 154(b) by 438 days.

(21) Appl. No.: 17/914,115

(22) PCT Filed: Mar. 27, 2020

(86) PCT No.: PCT/CN2020/081722
§ 371 (c)(1),
(2) Date: Sep. 23, 2022

(87) PCT Pub. No.: WO2021/189432
PCT Pub. Date: Sep. 30, 2021

(65) Prior Publication Data
US 2024/0215064 A1    Jun. 27, 2024

(51) Int. Cl.
*H04W 74/00* (2009.01)
*H04B 7/06* (2006.01)

(52) U.S. Cl.
CPC ...... *H04W 74/006* (2013.01); *H04B 7/06966* (2023.05)

(58) Field of Classification Search
CPC .............. H04W 74/006; H04B 7/06966
See application file for complete search history.

(56) References Cited

U.S. PATENT DOCUMENTS

| | | | |
|---|---|---|---|
| 2017/0215179 A1* | 7/2017 | Choi | H04W 16/14 |
| 2018/0288805 A1* | 10/2018 | Bhorkar | H04W 74/0816 |
| 2019/0342911 A1* | 11/2019 | Talarico | H04L 5/0098 |
| 2020/0053713 A1* | 2/2020 | Bang | H04L 5/0053 |
| 2020/0053777 A1* | 2/2020 | Babaei | H04W 72/04 |
| 2020/0053798 A1* | 2/2020 | Tsai | H04W 74/006 |

(Continued)

FOREIGN PATENT DOCUMENTS

| | | |
|---|---|---|
| CN | 110224802 A | 9/2019 |
| KR | 20190117254 A | 10/2019 |

OTHER PUBLICATIONS

PCT/CN2020/081722, "International Preliminary Report on Patentability", PCT Application No. PCT/CN2020/081722, Oct. 6, 2022, 5 pages.

(Continued)

Primary Examiner — Jael M Ulysse
(74) Attorney, Agent, or Firm — FIG. 1 Patents

(57) ABSTRACT

Embodiments of the present application are directed to a method and apparatus for channel access. A method according to an embodiment of the present application may include: receiving control information associated with a channel occupancy (CO) initiated by a base station, determining whether the CO can be shared for a physical uplink shared channel (PUSCH) transmission and an uplink transmission beam associated with the CO in the case of being shared based on the control information, and transmitting the PUSCH transmission with the determined uplink transmission beam in the case that the CO can be shared.

20 Claims, 9 Drawing Sheets

(56) References Cited

U.S. PATENT DOCUMENTS

| | | | | |
|---|---|---|---|---|
| 2020/0092913 A1* | 3/2020 | Xu | ......................... | H04L 5/0048 |
| 2020/0112978 A1* | 4/2020 | Zhang | .................... | H04W 72/21 |
| 2020/0146058 A1* | 5/2020 | Xu | ..................... | H04W 72/0453 |
| 2020/0154474 A1* | 5/2020 | Lo | ...................... | H04W 74/0808 |
| 2020/0280859 A1* | 9/2020 | Kim | ........................ | H04W 72/21 |
| 2020/0359411 A1* | 11/2020 | Li | ........................ | H04W 16/14 |
| 2020/0396731 A1* | 12/2020 | Venugopal | ............ | H04W 72/23 |
| 2021/0007149 A1* | 1/2021 | Li | ........................ | H04L 27/0006 |
| 2021/0050933 A1* | 2/2021 | Myung | ................. | H04L 1/0009 |
| 2021/0068135 A1* | 3/2021 | Shah | ................... | H04W 72/121 |
| 2021/0105812 A1* | 4/2021 | Rastegardoost | ...... | H04L 1/1671 |
| 2021/0120630 A1* | 4/2021 | Zhang | .................. | H04W 72/23 |
| 2021/0298080 A1* | 9/2021 | Wu | ................... | H04W 74/0816 |
| 2021/0392685 A1* | 12/2021 | Myung | ............. | H04W 72/0446 |
| 2022/0104259 A1* | 3/2022 | Li | ........................ | H04W 74/006 |
| 2022/0167407 A1* | 5/2022 | Oviedo | ............ | H04W 72/0446 |
| 2022/0167413 A1* | 5/2022 | Myung | ............. | H04W 74/0816 |
| 2022/0210827 A1* | 6/2022 | Wang | .................... | H04W 16/14 |
| 2022/0232636 A1* | 7/2022 | Shin | ....................... | H04W 72/23 |
| 2022/0377683 A1* | 11/2022 | Myung | ............. | H04W 74/0816 |
| 2023/0389071 A1* | 11/2023 | Li | .................... | H04W 74/0808 |

OTHER PUBLICATIONS

PCT/CN2020/081722, "International Search Report and Written Opinion", PCT Application No. PCT/CN2020/081722, Dec. 25, 2020, 6 pages.

* cited by examiner

METHOD AND APPARATUS FOR CHANNEL ACCESS

TECHNICAL FIELD

Embodiments of the present application generally relate to wireless communication technology, and especially to a method and apparatus for channel access, e.g., for 5G new radio on unlicensed spectrum (NR-U) uplink transmission.

BACKGROUND

A base station (BS) and a user equipment (UE) may operate in both licensed and unlicensed spectrum. Listen before talk (LBT) is a channel access technique used for transmission on an unlicensed spectrum. For transmission on unlicensed spectrum, in order to achieve fair coexistence with other wireless systems, a LBT procedure is required to be performed before a transmitter (e.g., a BS or a UE) can start a transmission on an unlicensed spectrum.

LBT is executed based on performing energy detection on a certain channel. Only when a LBT procedure generates a success result, the transmitter can start the transmission on the channel and occupy the channel up to a maximum channel occupancy time (MCOT); otherwise, the transmitter cannot start the transmission and continue performing LBT until a LBT procedure generates a successful result.

There are multiple categories of LBT, for example LBT Cat1, LBT Cat2, LBT Cat3 and LBT Cat4. LBT Cat1 means that no LBT procedure is performed by a transmitter. LBT Cat2 means that a LBT procedure is performed without random back-off, and the duration of time that the channel is sensed to be idle before the transmitter transmits is deterministic. LBT Cat3 means that a LBT procedure is performed with random back-off with a fixed contention window size. A transmitter draws a random number N within a contention window, the size of which is specified by a minimum and maximum value of N. The size of the content window is fixed. The random number N is used in the LBT procedure to determine the duration of time that the channel is sensed to be idle before the transmitter transmits on the channel. LBT Cat4 means that a LBT procedure is performed with random back-off with a variable contention window size. Similarly, a transmitter draws a random number M within a contention window, the size of which is specified by a minimum and maximum value of M. The transmitter can vary the size of the contention window when drawing the random number M. The random number M is used in the LBT procedure to determine the duration of time that the channel is sensed to be idle before the transmitter transmits on the channel.

Therefore, in order to transmit an uplink transmission, it is necessary for a UE to know the LBT related information for channel access.

SUMMARY OF THE APPLICATION

Embodiments of the present application provide a method and apparatus for channel access.

An embodiment of the present application provides a method. The method may include: receiving control information associated with a channel occupancy (CO) initiated by a base station, determining whether the CO can be shared for a physical uplink shared channel (PUSCH) transmission and an uplink transmission beam associated with the CO in the case of being shared based on the control information, and transmitting the PUSCH transmission with the determined uplink transmission beam in the case that the CO can be shared.

In an embodiment of the present application, the method may further include transmitting the PUSCH transmission based on additional control information for the PUSCH transmission different from the control information associated with the CO in the case that the CO cannot be shared.

In an embodiment of the present application, the control information is received in a group common-physical downlink control channel (GC-PDCCH) or a medium access control-control element (MAC-CE).

In an embodiment of the present application, the control information includes first control information indicating whether the CO can be shared. In the case that the first control information indicates the CO can be shared, the control information further includes second control information indicating the uplink transmission beam associated with the CO. The first control information is received in a group common-physical downlink control channel (GC-PDCCH). The second control information is received by high-layer signaling. The high-layer signaling is medium access control-control element (MAC-CE).

In an embodiment of the present application, the uplink transmission beam has a one-to-one correspondence with a sounding reference signal (SRS) resource index.

In an embodiment of the present application, transmitting the PUSCH transmission with the determined uplink transmission beam in the case that the CO can be shared comprises switching from a first channel access procedure to a second channel access procedure different from the first channel access procedure.

Another embodiment of the present application provides a method. The method may include: transmitting control information associated with a channel occupancy (CO) initiated by a base station, wherein the control information indicates whether the CO can be shared for a physical uplink shared channel (PUSCH) transmission and an uplink transmission beam associated with the CO in the case of being shared; and receiving the PUSCH transmission with a reception beam corresponding to the uplink transmission beam associated with the CO in the case that the CO can be shared.

In an embodiment of the present application, the method may further include receiving the PUSCH transmission based on additional control information for the PUSCH transmission different from the control information associated with the CO in the case that the CO cannot be shared.

In an embodiment of the present application, the control information is transmitted in a group common-physical downlink control channel (GC-PDCCH) or a medium access control-control element (MAC-CE).

In an embodiment of the present application, the control information includes first control information indicating whether the CO can be shared. In the case that the first control information indicates the CO can be shared, the control information further includes second control information indicating the uplink transmission beam associated with the CO. The first control information is transmitted in a group common-physical downlink control channel (GC-PDCCH). The second control information is transmitted by high-layer signaling. The high-layer signaling is medium access control-control element (MAC-CE).

In an embodiment of the present application, the uplink transmission beam has a one-to-one correspondence with a sounding reference signal (SRS) resource index.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

Embodiments of the present application can reduce the transmission delay by indicating the information about the uplink transmission beam within the spatial region of a CO initiated by a base station to the UE.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G. It is contemplated that along with developments of network architectures and new service scenarios, all embodiments in the present application are also applicable to similar technical problems; and moreover, the terminologies recited in the present application may change, which should not affect the principle of the present application.

Figure 1:
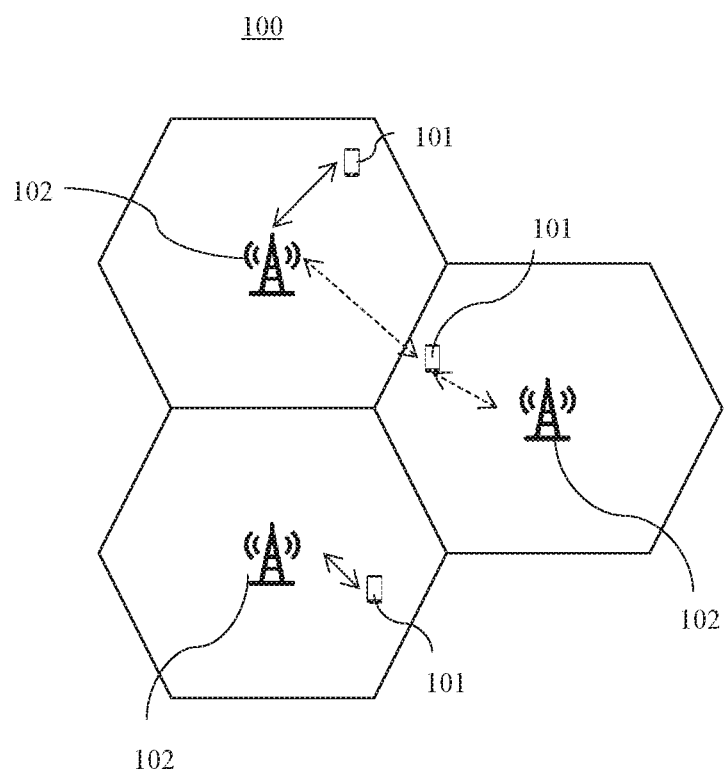
FIG. 1 illustrates a schematic diagram of a wireless communication system in accordance with some embodiments of the present application.

FIG. 1 illustrates a schematic diagram of a wireless communication system 100 in accordance with some embodiments of the present application.

As shown in FIG. 1, the wireless communication system 100 includes UE(s) 101 and BS(s) 102. In particular, the exemplary wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile phone, a mobile station, a user, a terminal, a mobile terminal, a wireless terminal, a fixed terminal, a subscriber station, a user terminal, or any device described using other terminology used in the art. The UEs 101 may communicate directly with the BSs 102 via uplink communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or any device described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G NR of the 3GPP protocol, wherein the BSs 102 transmit data using an orthogonal frequency division multiplexing (OFDM) modulation scheme on the downlink and the UEs 101 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, BS(s) 102 may communicate with UE(s) 101 using the 3GPP 5G protocols.

In order to achieve high link gain and wide coverage, beamforming is used on the millimeter wave (mmWave) band, for example, the frequency band around 60 GHz. However, in this case, omni-directional LBT may cause some issues. For example, omni-directional LBT used in License Assisted Access (LAA), Enhanced License Assisted Access (eLAA), Further Enhanced License Assisted Access (FeLAA), or NR-Unlicensed (NR-U) specified in 3GPP Release 16 may have an issue of over protection.

Figure 2A:
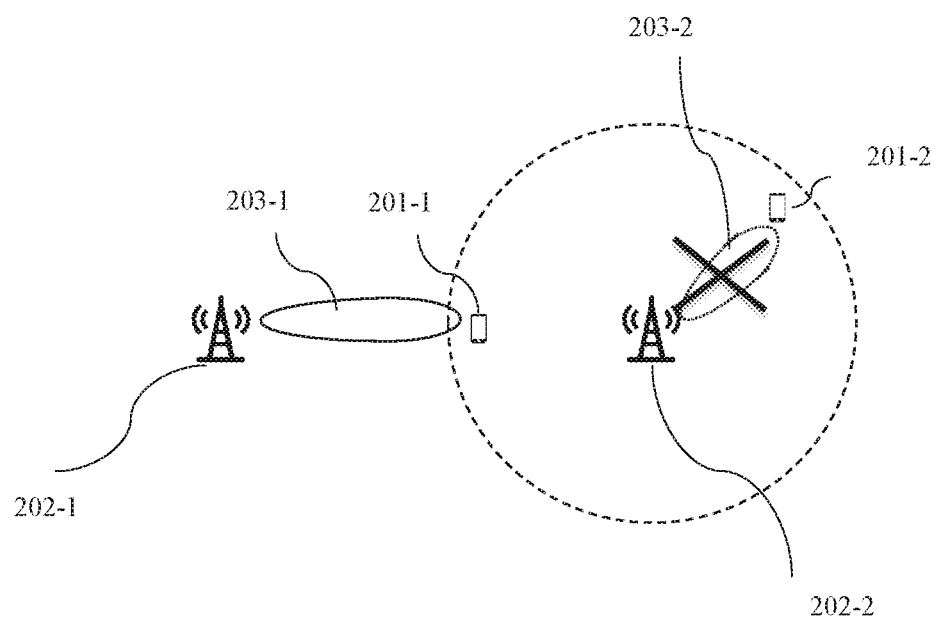
FIG. 2A illustrates an exemplary wireless communication system applying an omni-directional LBT mechanism.

FIG. 2A illustrates an exemplary wireless communication system applying an omni-directional LBT mechanism, which has an issue of over protection. In FIG. 2A, a first BS 202-1 is transmitting a transmission to a first UE 201-1 using a first transmission beam 203-1. Meanwhile, a second BS 202-2 also intends to transmit a transmission to a second UE 201-2 using a second transmission beam 203-2. Before that, the second BS 202-2 is configured to perform an omni-directional LBT procedure, which may sense the strong signal from the first BS 202-1 to the first UE 201-1. Therefore, the second BS 202-2 determines that the channel is occupied based on a failure result of the omni-directional LBT procedure. The second BS 202-2 will not transmit the transmission to the second UE 201-2, until an omni-directional LBT procedure generates a success result.

In other words, in a wireless communication system applying an omni-directional LBT mechanism, the strong signals sensed from the beam for transmissions, e.g., from the first BS 202-1 to the first UE 201-1, can block the transmissions of other nodes even if the used beams are in different beam directions. Accordingly, the omni-directional LBT technology decreases spatial multiplexing efficiency.

Figure 2B:
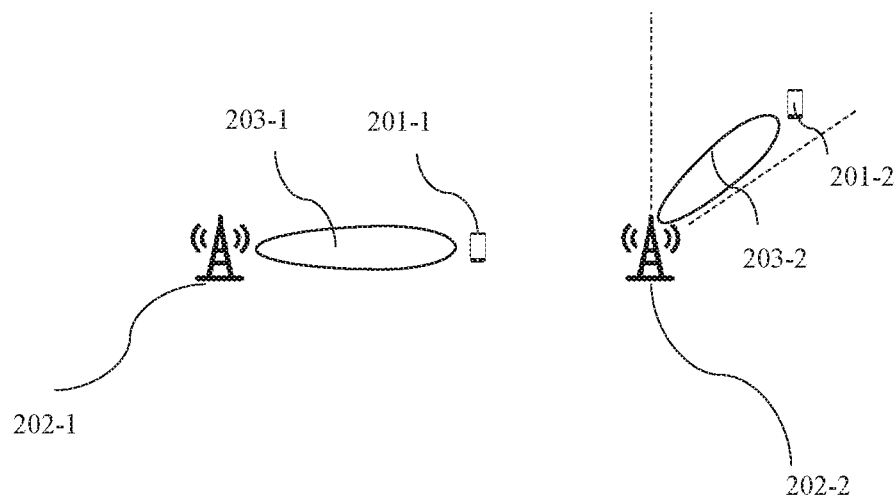
FIG. 2B illustrates an exemplary wireless communication system applying a directional LBT mechanism.

FIG. 2B illustrates an exemplary wireless communication system applying a directional LBT mechanism. The directional LBT is a LBT with an energy detection via a narrow beam. In FIG. 2B, a first BS 202-1 is transmitting a transmission to a first UE 201-1 using a first transmission beam 203-1. Meanwhile, the second BS 202-2 intends to communicate with the second UE 201-2 using a second transmission beam 203-2. Before that, the second BS 202-2 needs to perform a LBT procedure. Instead of an omni-directional LBT, the second BS 202-2 performs a directional LBT on a downlink channel within the region (marked with dashed lines) where the second transmission beam 203-2 is. Thus, the energy of the first transmission beam 203-1 cannot be detected by the directional LBT procedure. The directional LBT procedure can generate a success result indicating the channel being idle. Accordingly, the second BS 202-2 will transmit a downlink transmission to the second UE 201-2 using the second transmission beam 203-2. Apparently, the directional LBT procedure as illustrated in FIG. 2B can improve spatial multiplexing efficiency on unlicensed spectrum.

Nevertheless, some issues need to be solved when implementing the directional LBT mechanism.

One of the issues concerns how to share a channel occupancy (CO) initiated by a BS with a UE. The CO indicates a time-frequency resource, for example, duration in time domain and location in frequency domain which is allowed to be occupied, e.g. by a BS after a LBT procedure generates a successful result. For example, after a LBT procedure generates a successful result, a BS may initiate a CO and may occupy part of the initiated CO to transmit a downlink transmission to a UE. The rest part of the initiated CO, which is not occupied (a remaining CO), can be shared with the UE. When a corresponding uplink transmission is within the duration in time and location in frequency domain of the remaining CO initiated by the BS, the UE can use the LBT Cat2 to access the channel, which can reduce the transmission delay.

As stated above, under a directional LBT scenario, an uplink transmission beam of an uplink transmission should be restricted within the spatial region of a CO initiated by a BS when a UE shares the CO initiated by a BS. However, in some cases, the UE lacks the information on whether the uplink transmission beam indicated in an uplink grant is within the spatial region of the CO initiated by the base station, and thus cannot determine whether the CO initiated by the base station can be shared for the uplink transmission.

Figure 3:
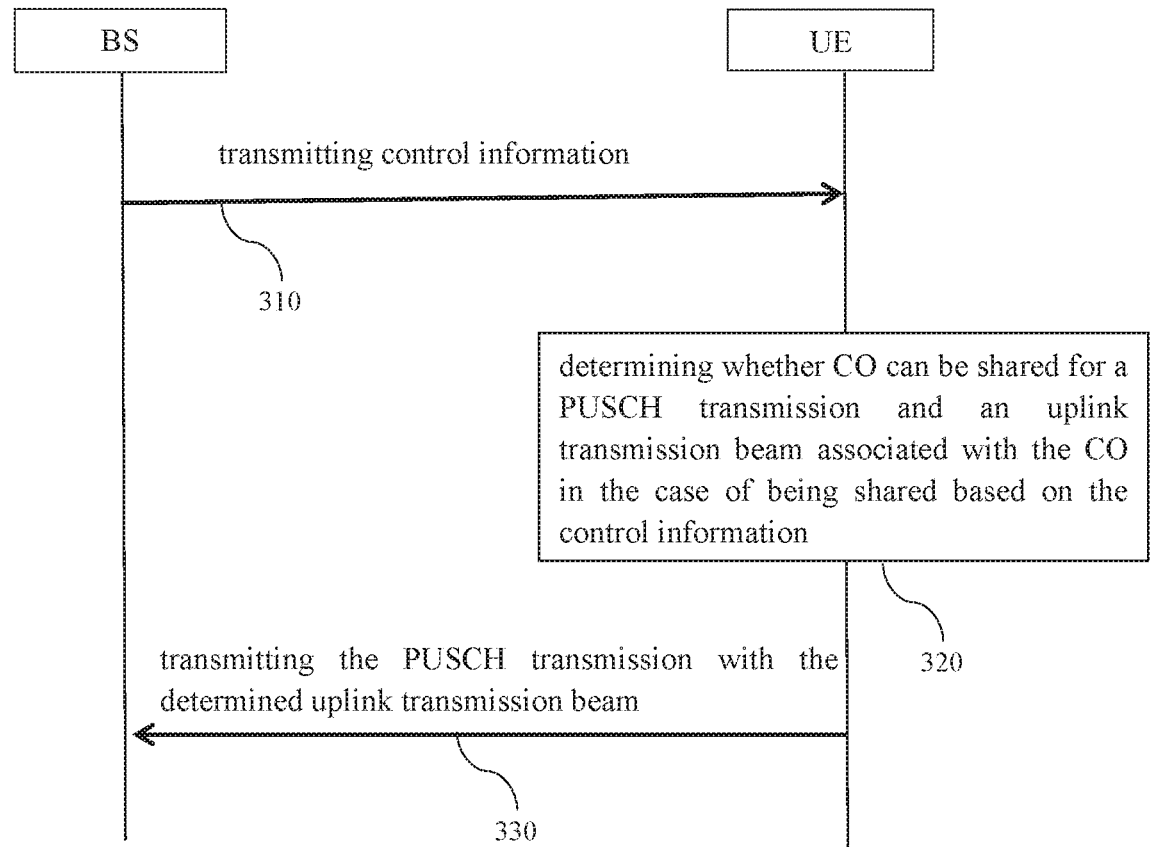
FIG. 3 is an exemplary flow chart illustrating a method for channel access according to some embodiments of the present application.

FIG. 3 is an exemplary flow chart illustrating a method for channel access according to some embodiments of the present application.

In FIG. 3, after a LBT procedure generates a successful result, a BS (e.g., BS 102 illustrated in FIG. 1) will initiate a CO and may occupy part of the initiated CO to transmit a downlink transmission to a UE (e.g., UE 101 illustrated in FIG. 1). For example, in step 310, the BS may transmit control information to the UE, which is associated with the CO initiated by the base station. For example, the control information may include information on at least one time-frequency resource of the remaining CO, and/or information indicating whether the remaining CO can be shared for a physical uplink shared channel (PUSCH) transmission and an uplink transmission beam associated with the remaining CO in the case of being shared. More details on the control information will be illustrated later.

In an embodiment of the present application, the BS may transmit the control information in a group common-physical downlink control channel (GC-PDCCH), which is for transmitting control information from the network side to multiple UEs. The GC-PDCCH may refer to a channel (e.g., either a PDCCH or a separately designed channel) that carries information intended for a group of UEs. The GC-PDCCH may be used for carrying some important information for the UEs to perform corresponding operations. For example, in 3GPP TS 37.213, the GC-PDCCH is used for carrying the information related to time-frequency resource of a remaining CO initiated by the BS. In another embodiment of the present application, the BS may transmit the control information by a high-layer signaling, such as a medium access control-control element (MAC-CE). In yet another embodiment of the present application, the BS may transmit a part of the control information in a GC-PDCCH, and transmit the other part of the control information by a high-layer signaling.

Accordingly, a UE may receive control information associated with the CO initiated by a base station from the BS. In step 320, the UE may determine whether the remaining CO can be shared for the PUSCH transmission and the uplink transmission beam associated with the remaining CO for the PUSCH transmission in the case that the remaining CO can be shared, based on the control information.

And then, in the case that the remaining CO can be shared, in step 330, the UE transmits the PUSCH transmission with the determined uplink transmission beam. Accordingly, the BS may receive the PUSCH transmission with a reception beam corresponding to the uplink transmission beam.

As described above, in some embodiments of the present application, the control information is transmitted in the GC-PDCCH. Information indicating that the UE cannot share the remaining CO initiated by a BS and information indicating that the uplink transmission beam in the case that the UE can share the remaining CO initiated by the BS can be jointly encoded. A new field can be introduced to the GC-PDCCH to carry the jointly encoded information.

The jointly encoded information may include multiple states corresponding to the control information. For example, a first state of the new field may indicate that the UE cannot share the remaining CO initiated by the BS; a second state of the new field may indicate that the UE can share the remaining CO initiated by the BS by using an uplink transmission beam corresponding to the second state, e.g., a first uplink transmission beam; and a third state of the new field may indicate that the UE can share the remaining CO initiated by the BS by using an uplink transmission beam corresponding to the third state, e.g., a second uplink transmission beam; and so on.

In some embodiments of the present application, the uplink transmission beam indicated by the new field has a one-to-one correspondence with the sounding reference signal (SRS) resource index in the SRS resource indicator (SRI) field in downlink control information (DCI) format 0_1, e.g. a first uplink transmission beam indicated by the new field may correspond to a first SRS resource index, a second uplink transmission beam indicated by the new field may correspond to a second SRS resource index, a third uplink transmission beam indicated by the new field may correspond to a third SRS resource index, and so on. Therefore, after receiving the new field in the GC-PDCCH, according to the correspondence, the UE can know (or determine) which uplink transmission beam will be used to transmit the PUSCH transmission. It should be understood that determining the uplink transmission beam by the UE according to the correspondence is just an example, and persons skilled in the art would appreciate that other methods for determining the uplink transmission beam can also be used according to actual situations or needs.

In an exemplary embodiment, a UE may have 3 uplink transmission beams, for example, an uplink transmission beam A, an uplink transmission beam B, and an uplink transmission beam C, so there are 2 bits for SRI field in DCI format 0_1, wherein the DCI format 0_1 is used for scheduling uplink transmission(s) and is also called an uplink grant. For example, SRS resource indexes in the SRI field may be 00, 01, and 10, wherein the index 00 may represent the uplink transmission beam A, the index 01 may represent the uplink transmission beam B, and the index 10 may represent the uplink transmission beam C.

In the exemplary embodiment, 2 bits can be configured for the jointly encoded information indicating 4 states in a new field of the GC-PDCCH. The BS can encode four states with the 2 bits in any adaptive manner. For example, the BS may encode the first state indicating that the UE cannot share the remaining CO initiated by the BS as 11, encode the second state indicating that the UE can share the remaining CO initiated by the BS by using the uplink transmission beam A as 00, encode the third state indicating that the UE can share the remaining CO initiated by the BS by using the uplink transmission beam B as 01, and encode the fourth state of indicating that the UE can share the remaining CO initiated by the BS by using the uplink transmission beam C as 10. For example, if the UE receives the encoded information 10 in the GC-PDCCH, according to the correspondence, that is, 10 in the GC-PDCCH corresponds to SRS resource index "10", thus the UE knows that the uplink transmission beam C will be used to transmit the PUSCH transmission. In another example, for the new field in the GC-PDCCH, the BS may encode the first state indicating that the UE cannot share the remaining CO initiated by the BS as 00, encode the second state indicating that the UE can share the remaining CO initiated by the BS by using the uplink transmission beam A as 01, encode the third state indicating that the UE can share the remaining CO initiated by the BS by using the uplink transmission beam B as 10; and encode the fourth state indicating that the UE can share the remaining CO initiated by the BS by using the uplink transmission beam C as 11. For example, if the UE receives the encoded information 11 in the GC-PDCCH, according to the correspondence, that is, 11 in the GC-PDCCH corresponds to SRS resource index 10, thus the UE knows that the uplink transmission beam C will be used to transmit the PUSCH transmission.

In another exemplary embodiment, a UE may have 4 uplink transmission beams, for example, an uplink transmission beam A, an uplink transmission beam B, an uplink transmission beam C, and an uplink transmission beam D, so there are 2 bits for the 'SRI' field in the DCI format 0_1. For example, the SRS resource indexes in the SRI field may include 00, 01, 10, and 11, and the index 00 may represent the uplink transmission beam A, the index 01 may represent the uplink transmission beam B, the index 10 may represent the uplink transmission beam C, and the index 11 may represent the uplink transmission beam D. In the exemplary embodiment, 3 bits can be configured for the jointly encoded information indicating 5 states in a new field of the GC-PDCCH. The BS can encode five states with the 3 bits in any adaptive manner. For example, the BS may encode the first state indicating that the UE cannot share the remaining CO initiated by the BS as 000, encode the second state indicating that the UE can share the remaining CO initiated by the BS by using the uplink transmission beam A as 001, encode the third state indicating that the UE can share the remaining CO initiated by the BS by using the uplink transmission beam B as 010, encode the fourth state indicating that the UE can share the remaining CO initiated by the BS by using the uplink transmission beam C as 011, and encode the fifth state indicating that the UE can share the remaining CO initiated by the BS by using the uplink transmission beam D as 100. For example, if the UE receives the encoded information 100 in the GC-PDCCH, according to the correspondence, that is, 100 in the GC-PDCCH corresponds to SRS resource index 11, thus the UE knows that the uplink transmission beam D will be used to transmit the PUSCH transmission.

Figure 4A:
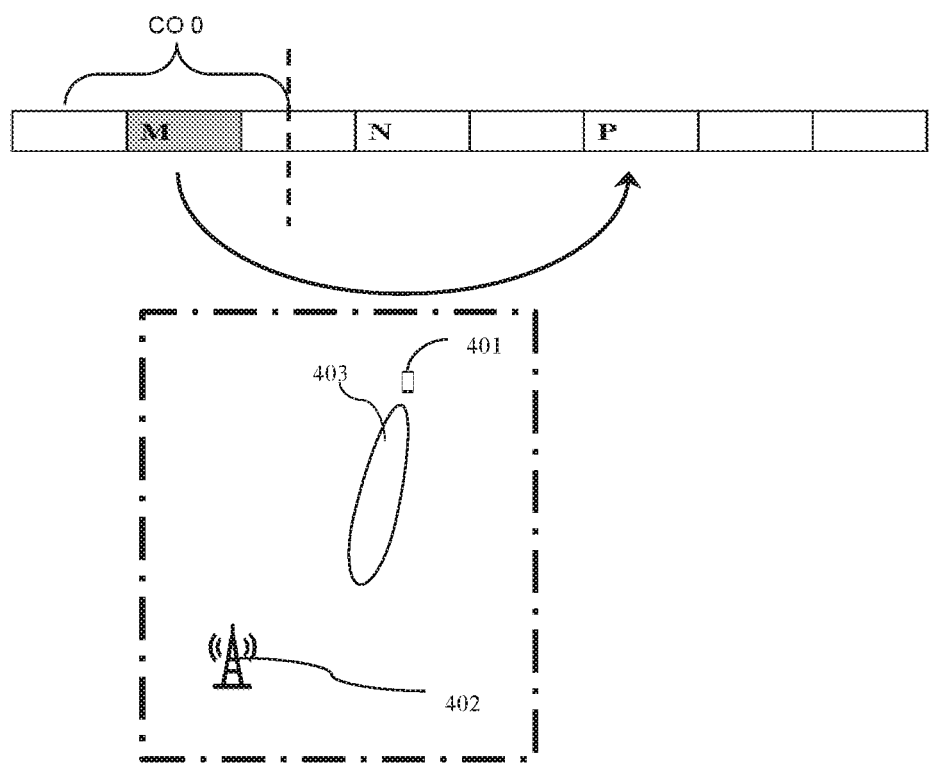
FIGS. 4A-4C together illustrate a schematic diagram of applying a mechanism of sharing a CO initiated by a base station with a UE according to some embodiments of the present application.
Figure 4B:
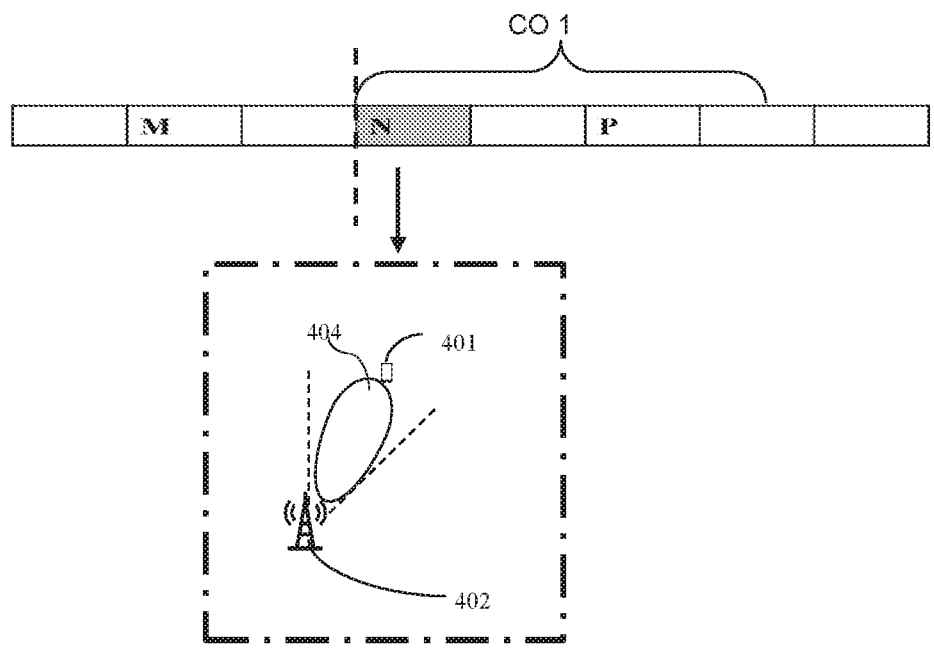
Figure 4C:
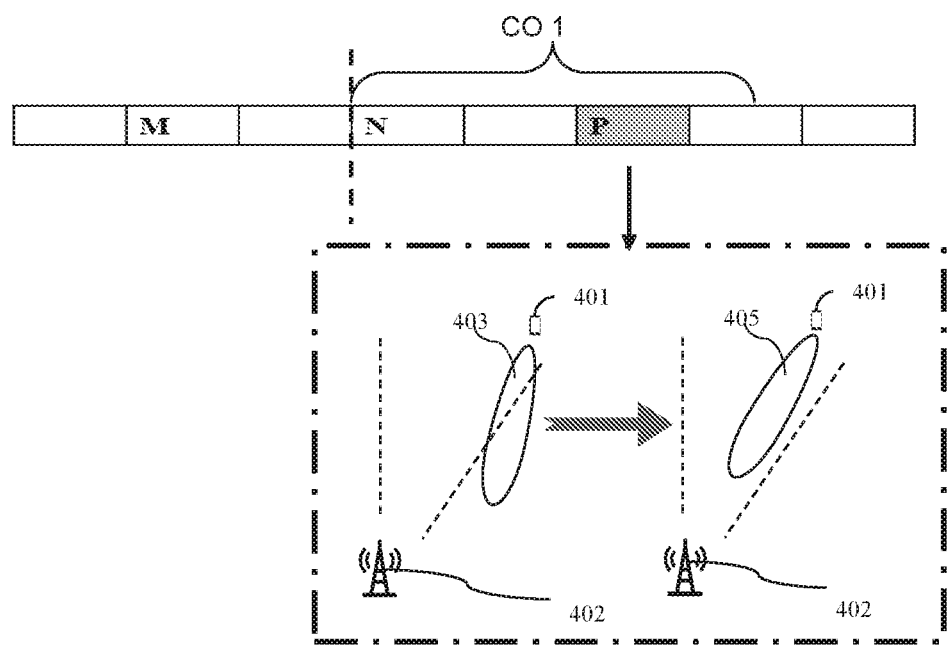

FIGS. 4A-4C together illustrate a schematic diagram of applying a mechanism of sharing a CO initiated by a base station with a UE according to some embodiments of the present application. Now, we will describe some embodiments of a method for channel access by transmitting the control information in the GC-PDCCH in connection with FIGS. 4A-4C.

As shown in FIG. 4A, slot M is within CO 0 initiated by a BS 402. In slot M, a UE 401 receives an uplink grant from the BS 402. The uplink grant indicates that the UE 401 is scheduled to transmit a PUSCH transmission by using a first uplink transmission beam 403, e.g., beam A in slot P. Since CO 0 ends before slot N and slot P is after slot N, the BS 402 knows that the scheduled PUSCH transmission in slot P is not within CO 0 and the uplink grant indicates the UE 401 to perform a LBT-Cat4 procedure for the scheduled PUSCH transmission in slot P.

And then, as shown in FIG. 4B, in slot N, after performing a directional LBT within a region (marked with dashed lines), e.g., with a downlink transmission beam 404 successfully, the BS 402 initiates a new CO, e.g., CO 1 as shown in FIG. 4B, covering slot P. Furthermore, the BS 402 knows the scheduled PUSCH transmission in slot P is within CO 1, but the first uplink transmission beam 403 (e.g., beam A) earlier-indicated in the uplink grant cannot meet the criterion for switching from LBT-Cat4 to LBT-Cat2. Therefore, besides the information indicating the duration in time domain and the location in frequency domain of the remaining CO 1, the BS 402 will further indicate a second uplink transmission beam 405 (e.g., beam B) as shown in FIG. 4C to the UE 401. As shown in FIG. 4B, the BS 402 transmits control information indicating the second uplink transmission beam 405 for the UE 401 to transmit the PUSCH transmission in the GC-PDCCH. For example, the BS 402 may transmit the control information indicating the second uplink transmission beam 405 in a GC-PDCCH by using the downlink transmission beam 404 in slot N. In another example, the BS 402 may transmit the control information indicating the second uplink transmission beam 405 in a GC-PDCCH by using the downlink transmission beam 404 or another downlink transmission beam in another slot, such as in a slot between slot N and slot P.

The UE 401 may detect and decode the control information from the GC-PDCCH. Based on the control information, the UE 401 may determine that the scheduled PUSCH transmission in slot P is within CO 1, and the second uplink transmission beam 405 can be used for transmitting the PUSCH transmission by performing a LBT-Cat2 procedure.

In slot P, after performing a successful LBT-Cat2 procedure, as shown in FIG. 4C, the UE 401 transmits the PUSCH transmission by using the second uplink transmission beam 405 rather than the first uplink transmission beam 403, to the BS 402.

In some other embodiments, in the case that the first uplink transmission beam 403 may also meet the criterion for switching from LBT-Cat4 to LBT-Cat2, the first uplink transmission beam 403 is indicated in the GC-PDCCH, to the UE 401. A similar process will be performed and thus is omitted here.

In some other embodiments, the BS 402 may determine that the UE 401 cannot share the remaining CO 1 initiated by the BS. In slot N, although the BS 402 knows the scheduled PUSCH transmission in slot P is within CO 1, the BS 402 will transmit control information indicating the UE 401 cannot share the remaining CO 1 initiated by the BS in the GC-PDCCH. For example, the UE 401 may receive the GC-PDCCH in which the field for CO sharing being 000 indicating that the UE cannot share the remaining CO initiated by the BS. In slot P, after performing a LBT-Cat4 procedure, the UE 401 transmits the PUSCH transmission by using the first uplink transmission beam 403 as scheduled, to the BS 402.

In the above embodiments, the control information is transmitted in the GC-PDCCH. However, persons skilled in the art can understand that they can be indicated to the UE by various manners. For example, in some embodiments, a part of the control information may be transmitted in the GC-PDCCH and the rest part of the control information may be transmitted by the high-layer signaling from the BS.

Specifically, the information indicating whether the remaining CO can be shared for a PUSCH transmission in the control information may be realized a new field in the GC-PDCCH. Moreover, the new field in the GC-PDCCH may indicate two states, for example, a first state may indicate that the UE cannot share the remaining CO initiated by the BS and may be represented as 0, and a second state may indicate that the UE can share the remaining CO initiated by the BS and may be represented as 1. Furthermore, in the case that the field indicates the second state indicating the UE can share the remaining CO initiated by the BS, a new MAC-CE may further indicate a corresponding uplink transmission beam for transmitting the PUSCH transmission. For example, there is a field in the new MAC-CE, and different value of the field may indicate a different uplink transmission beam.

In the embodiment of the present application, the uplink transmission beam indicated by the new MAC-CE has a one-to-one correspondence with the SRS resource index, e.g. a first uplink transmission beam corresponds to a first SRS resource index, a second uplink transmission beam corresponds to a second SRS resource index, a third uplink transmission beam corresponds to a third SRS resource index, and so on. Therefore, upon reception of the field in the new MAC-CE, according to the correspondence, the UE may know (or determine) which uplink transmission beam will be used to transmit the PUSCH transmission. It should be understood that determining the uplink transmission beam by the UE according to the correspondence is just an example, and persons skilled in the art would appreciate that other methods for determining the uplink transmission beam can also be used according to actual situations or needs.

In particular, in an exemplary embodiment, a UE may have 3 uplink transmission beams, for example, an uplink transmission beam A, an uplink transmission beam B, and an uplink transmission beam C, so there are 2 bits for 'SRI' field in the DCI format 0_1. For example, the SRS resource indexes in the SRI field may include 00, 01, and 10, and the index 00 represents the uplink transmission beam A, the index 01 represents the uplink transmission beam B, and the index 10 represents the uplink transmission beam C.

In the exemplary embodiment, for the field in the new MAC-CE, if this field of the new MAC-CE is set to a first value, the UE can share the remaining CO initiated by the BS by using the uplink transmission beam (for example, the uplink transmission beam A) corresponding to the first value; if this field of the new MAC-CE is set to a second value, the UE can share the remaining CO initiated by the BS by using the uplink transmission beam (for example, the uplink transmission beam B) corresponding to the second value; if this field of the new MAC-CE is set to a third value, the UE can share the remaining CO initiated by the BS by using the uplink transmission beam (for example, the uplink transmission beam C) corresponding to the third value. For example, if the UE receives the third value in the new MAC-CE, according to the correspondence, that is, the third value in the new MAC-CE corresponds to SRS resource index "10", thus the UE knows that the uplink transmission beam C will be used to transmit the PUSCH transmission.

Now, we will describe some other embodiment of a method for channel access by transmitting the control information in the GC-PDCCH and the new MAC-CE in connection with FIGS. 4A-4C.

As shown in FIG. 4A, slot M is within CO 0 initiated by a BS 402. In slot M, a UE 401 receives an uplink grant from the BS 402. The uplink grant indicates that the UE 401 is scheduled to transmit a PUSCH transmission by using a first uplink transmission beam 403, e.g., beam A in slot P. Since CO 0 ends before slot N and slot P is after slot N, the BS 402 knows that the scheduled PUSCH transmission in slot P is not within CO 0 and the uplink grant indicates the UE 401 to perform a LBT-Cat4 procedure for the scheduled PUSCH transmission in slot P.

And then, as shown in FIG. 4B, in slot N, after performing a directional LBT within the region (marked with dashed lines), e.g., with a downlink transmission beam 404 successfully, the BS 402 initiates a new CO, e.g., CO 1 as shown in FIG. 4B, covering slot P. Furthermore, the BS 402 knows that the scheduled PUSCH transmission in slot P is within CO 1, and the UE 401 can share the remaining CO 1. Therefore, besides the information indicating the duration in time domain and the location in frequency domain of the remaining CO 1, the BS 402 will further indicate that the UE 401 can share the remaining CO 1 in the GC-PDCCH, for example, by setting the new field in GC-PDCCH to 1. As shown in FIG. 4B, the BS 402 transmits the GC-PDCCH in which the new field being 1 indicating the UE 401 can share the remaining CO 1. For example, the BS 402 may transmit the GC-PDCCH in which the new field being 1 indicates that the UE 401 can share the remaining CO 1 by using the downlink transmission beam 404 in slot N. In another example, the BS 402 may transmit the GC-PDCCH in which the new field being 1 indicating that the UE 401 can share the remaining CO 1 by using the downlink transmission beam 404 or another downlink transmission beam in another slot, such as in a slot between slot N and slot P. Furthermore, the BS 402 also knows that the first uplink transmission beam 403 (e.g., beam A) earlier-indicated in the uplink grant cannot meet the criterion for switching from LBT-Cat4 to LBT-Cat2. Thus, after transmitting the GC-PDCCH, the BS 402 transmits a MAC-CE indicating a second uplink transmission beam 405 (e.g., beam B) as shown in FIG. 4C for the UE 401 to transmit the PUSCH transmission.

Upon reception of the GC-PDCCH, the UE 401 may determine that the scheduled PUSCH transmission in slot P is within CO 1, and the UE 401 can share the remaining CO 1 initiated by the BS 402 and it should perform a LBT-Cat2 procedure before transmitting the PUSCH transmission. Moreover, upon reception of the MAC-CE, the UE 401 may determine that it should use the second uplink transmission beam 405 for transmitting the PUSCH transmission.

In slot P, after performing a successful LBT-Cat2 procedure, as shown in FIG. 4C, the UE 401 transmits the PUSCH transmission by using the second uplink transmission beam 405 rather than the first uplink transmission beam 403, to the BS 402.

In some other embodiments, in the case that the first uplink transmission beam 403 can also meet the criterion for switching from LBT-Cat4 to LBT-Cat2, the first uplink transmission beam 403 is indicated in the MAC-CE, to the UE 401. A similar process will be performed and thus is omitted here.

In some other embodiments, in the case that the first uplink transmission beam 403 can also meet the criterion for switching from LBT-Cat4 to LBT-Cat2, after transmitting the GC-PDCCH in which the new field being 1 indicating that the UE 401 can share the remaining CO 1, the BS 402 will not transmit the new MAC-CE, and thus, the UE 401 will not receive the new MAC-CE. In slot P, after performing a successful LBT-Cat2 procedure, as shown in FIG. 4C, the UE 401 transmits the PUSCH transmission to the BS 402 by using the first uplink transmission beam 403.

In some other embodiments, the BS 402 may determine that the UE 401 cannot share the remaining CO 1 initiated by the BS. In slot N, although the BS 402 knows the scheduled PUSCH transmission in slot P is within CO 1, the BS 402 will transmit control information indicating the UE 401 cannot share the remaining CO 1 initiated by the BS in the GC-PDCCH. Thus, the UE 401 may receive the GC-PDCCH in which the new field for CO sharing being 0 indicating that the UE cannot share the remaining CO initiated by the BS, and will not receive the new MAC-CE. And then in slot P, after performing a LBT-Cat4 procedure, the UE 401 transmits the PUSCH transmission by using the first uplink transmission beam 403 as scheduled, to the BS 402.

In the above embodiments, the control information is transmitted in the GC-PDCCH and the MAC-CE. However, persons skilled in the art can understand that they can be indicated to the UE by various manners. For example, in some embodiments, the control information may be transmitted in the MAC-CE from the BS.

Specifically, the control information is transmitted in a new MAC-CE. For example, there is a field in the new MAC-CE. In the field, the BS may jointly encode information indicating that the UE cannot share the remaining CO initiated by the BS and information regarding the uplink transmission beam in the case that the UE can share the remaining CO initiated by the BS.

In the embodiment of the present application, the uplink transmission beam indicated by the new MAC-CE has a one-to-one correspondence with the SRS resource index, e.g. a first uplink transmission beam corresponds to a first SRS resource index, a second uplink transmission beam corresponds to a second SRS resource index, a third uplink transmission beam corresponds to a third SRS resource index, and so on. Therefore, upon reception of the field in the new MAC-CE, according to the correspondence, the UE may know (or determine) which uplink transmission beam will be used to transmit the PUSCH transmission. It should be understood that determining the uplink transmission beam by the UE according to the correspondence is just an example, and persons skilled in the art would appreciate that other methods for determining the uplink transmission beam can also be used according to actual situations or needs.

In particular, in an exemplary embodiment, a UE may have 3 uplink transmission beams, for example, an uplink transmission beam A, an uplink transmission beam B, and an uplink transmission beam C, so there are 2 bits for 'SRI' field in the DCI format 0_1. For example, the SRS resource indexes in the SRI field may include 00, 01, and 10, and the index 00 represents the uplink transmission beam A, the index 01 represents the uplink transmission beam B, and the index 10 represents the uplink transmission beam C.

In the exemplary embodiment, for the field in the new MAC-CE, the BS may jointly encode the control information as follows: if this field of the new MAC-CE is set to (or encoded as) a first value, the UE cannot share the remaining CO initiated by the BS; if this field of the new MAC-CE is set to a second value, the UE can share the remaining CO initiated by the BS by using the uplink transmission beam (for example, the uplink transmission beam A) corresponding to the second value; if this field of the new MAC-CE is set to a third value, the UE can share the remaining CO initiated by the BS by using the uplink transmission beam (for example, the uplink transmission beam B) corresponding to the third value; if this field of the new MAC-CE is set to a fourth value, the UE can share the remaining CO initiated by the BS by using the uplink transmission beam (for example, the uplink transmission beam C) corresponding to the fourth value. For example, if the UE receives the fourth value in the new MAC-CE, according to the correspondence, that is, the fourth value in the new MAC-CE corresponds to SRS resource index 10, thus the UE knows that the uplink transmission beam C will be used to transmit the PUSCH transmission.

Now, we will describe some yet other embodiments of a method for channel access by transmitting the control information in the new MAC-CE in connection with FIGS. 4A-4C.

As shown in FIG. 4A, slot M is within CO 0 initiated by a BS 402. In slot M, a UE 401 receives an uplink grant from the BS 402. The uplink grant indicates that the UE 401 is scheduled to transmit a PUSCH transmission by using a first uplink transmission beam 403, e.g., beam A in slot P. Since CO 0 ends before slot N and slot P is after slot N, the BS 402 knows that the scheduled PUSCH transmission in slot P is not within CO 0 and the uplink grant indicates the UE 401 to perform a LBT-Cat4 procedure for the scheduled PUSCH transmission in slot P.

And then, as shown in FIG. 4B, in slot N, after performing a directional LBT within the region (marked with dashed lines), e.g., with a downlink transmission beam 404 successfully, the BS 402 initiates a new CO, e.g., CO 1 as shown in FIG. 4B, covering slot P, and transmits a GC-PDCCH indicating duration in time domain and location in frequency domain of the remaining CO 1 to the UE 401. For example, the BS 402 may transmit the GC-PDCCH indicating duration in time domain and location in frequency domain of the remaining CO 1 by using the downlink transmission beam 404 in slot N. In another example, the BS 402 may transmit the GC-PDCCH indicating duration in time domain and location in frequency domain of the remaining CO 1 by using the downlink transmission beam 404 or another downlink transmission beam in another slot, such as in a slot between slot N and slot P. Furthermore, the BS 402 knows the scheduled PUSCH transmission in slot P is within CO 1 and the UE 401 can share the remaining COI, but the first uplink transmission beam 403 (e.g., beam A) earlier-indicated in the uplink grant cannot meet the criterion for switching from LBT-Cat4 to LBT-Cat2. Therefore, the BS 402 will further indicate a second uplink transmission beam 405 (e.g., beam B) as shown in FIG. 4C for transmitting the PUSCH transmission to the UE 401 by the corresponding value in the field of the new MAC-CE.

Upon reception and decoding of the GC-PDCCH, the UE 401 may determine that the scheduled PUSCH transmission in slot P is within CO 1. Furthermore, upon reception of the new MAC-CE, the UE 401 may also determine that it can share the remaining CO 1 initiated by the BS 402, and the second uplink transmission beam 405 can be used for transmitting the PUSCH transmission after performing a LBT-Cat2 procedure.

In slot P, after performing a successful LBT-Cat2 procedure, as shown in FIG. 4C, the UE 401 transmits the PUSCH transmits by using the second uplink transmission beam 405 rather than the first uplink transmission beam 403, to the BS 402.

In some other embodiments, in the case that the first uplink transmission beam 403 may also meet the criterion for switching from LBT-Cat4 to LBT-Cat2, the first uplink transmission beam 403 is indicated in the new MAC-CE, to the UE 401. A similar process will be performed and thus is omitted here.

In some other embodiments, in the case that the first uplink transmission beam 403 may also meet the criterion for switching from LBT-Cat4 to LBT-Cat2, the UE 401 will not receive the new MAC-CE. In slot P, after performing a successful LBT-Cat2 procedure, as shown in FIG. 4C, the UE 401 transmits the PUSCH transmission by using the first uplink transmission beam 403, to the BS 402.

In some other embodiments, the BS 402 may determine that the UE 401 cannot share the remaining CO 1 initiated by the BS. In slot N, although the BS 402 knows the scheduled PUSCH transmission in slot P is within CO 1, the BS 402 will transmit control information indicating the UE 401 cannot share the remaining CO 1 initiated by the BS in the new MAC-CE. For example, the UE 401 will receive the new MAC-CE in which the field is the first value. And then in slot P, after performing a LBT-Cat4 procedure, the UE 401 transmits the PUSCH transmission by using the first uplink transmission beam 403 as scheduled, to the BS 402.

Therefore, through the above described embodiments of the present application, a directional LBT scheme may be used to reduce the transmission delay by indicating the information about the uplink transmission beam within the spatial region of the CO to the UE.

Figure 5:
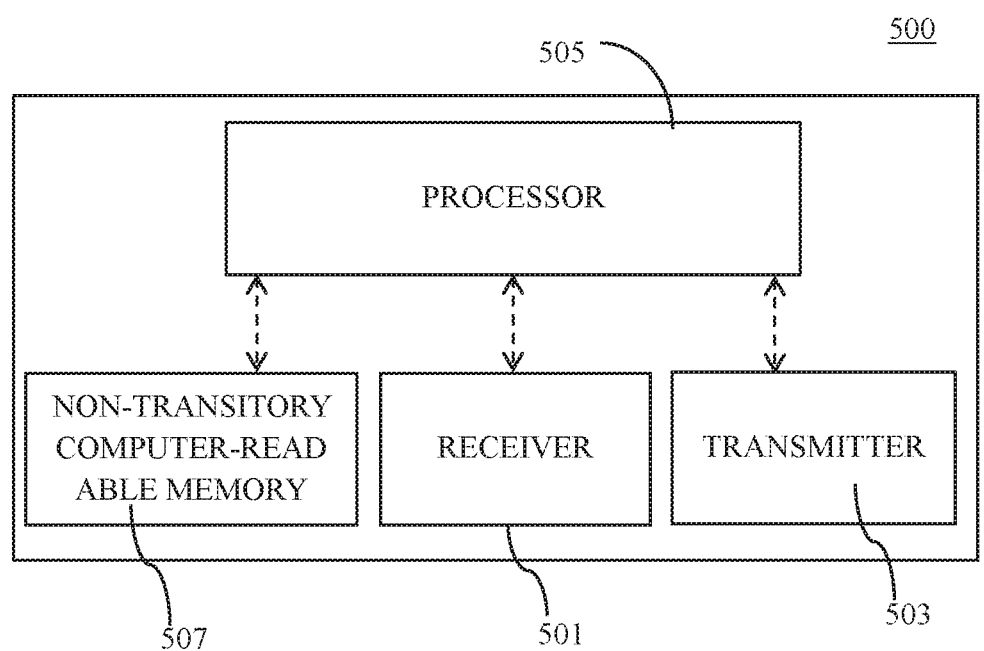
FIG. 5 illustrates an apparatus according to some embodiments of the present application.

FIG. 5 illustrates an apparatus according to some embodiments of the present application. In some embodiments of the present disclosure, the apparatus 500 may be UE 101*a* or UE 101*b* illustrated in FIG. 1 or the UE in other embodiments of the present application.

As shown in FIG. 5, the apparatus 500 may include a receiver 501, a transmitter 503, a processor 505, and a non-transitory computer-readable medium 507. The non-transitory computer-readable medium 507 has computer executable instructions stored therein. The processor 505 is configured to be coupled to the non-transitory computer readable medium 507, the receiver 501, and the transmitter 503. It is contemplated that the apparatus 500 may include more computer-readable mediums, receiver, transmitter and processors in some other embodiments of the present application according to practical requirements. In some embodiments of the present application, the receiver 501 and the transmitter 503 are integrated into a single device, such as a transceiver. In certain embodiments, the apparatus 500 may further include an input device, a memory, and/or other components.

In some embodiments of the present application, the non-transitory computer-readable medium 507 may have stored thereon computer-executable instructions to cause a processor to implement the above methods according to embodiments of the present application.

Figure 6:
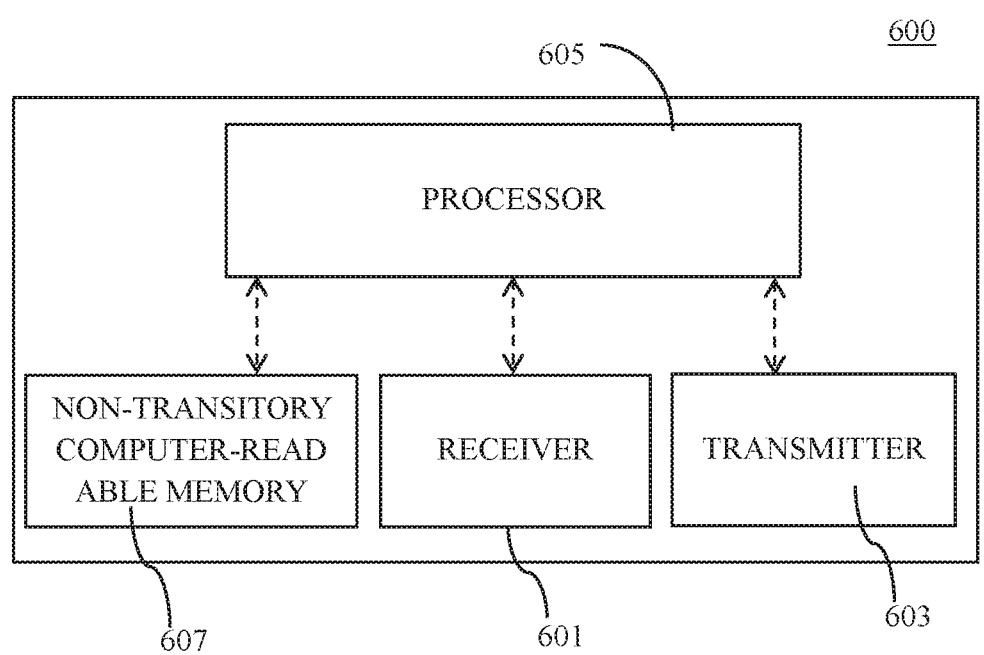
FIG. 6 illustrates an apparatus according to some other embodiments of the present application.

FIG. 6 illustrates an apparatus according to some other embodiments of the present application. In some embodiments of the present disclosure, the apparatus 600 may be BS 102 illustrated in FIG. 1 or the BS in other embodiments of the present application.

As shown in FIG. 6, the apparatus 600 may include a receiver 601, a transmitter 603, a processor 605, and a non-transitory computer-readable medium 607. The non-transitory computer-readable medium 607 has computer executable instructions stored therein. The processor 605 is configured to be coupled to the non-transitory computer readable medium 607, the receiver 601, and the transmitter 603. It is contemplated that the apparatus 600 may include more computer-readable mediums, receiver, transmitter and processors in some other embodiments of the present application according to practical requirements. In some embodiments of the present application, the receiver 601 and the transmitter 603 are integrated into a single device, such as a transceiver. In certain embodiments, the apparatus 600 may further include an input device, a memory, and/or other components.

In some embodiments of the present application, the non-transitory computer-readable medium 607 may have stored thereon computer-executable instructions to cause a processor to implement the above methods according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises." "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:
   receiving control information associated with a channel occupancy (CO) initiated by a base station, wherein the control information indicates whether the CO is shareable;
   determining, based at least in part on the control information, whether the CO is shareable for a physical uplink shared channel (PUSCH) transmission;
   determining, if the CO is shareable, an uplink transmission beam associated with the CO; and
   transmitting, if the CO is shareable, the PUSCH transmission with the uplink transmission beam.

2. The method of claim 1, further comprising transmitting the PUSCH transmission based on additional control information for the PUSCH transmission different from the control information associated with the CO if the CO is not shareable.

3. The method of claim 1, wherein the control information is received in a group common-physical downlink control channel (GC-PDCCH) or a medium access control-control element (MAC-CE).

4. The method of claim 1, wherein, if the control information indicates the CO is shareable, the control information further includes additional control information indicating the uplink transmission beam associated with the CO.

5. The method of claim 4, wherein the control information is received in a group common-physical downlink control channel (GC-PDCCH), and the additional control information is received by high-layer signaling.

6. The method of claim 1, wherein the uplink transmission beam has a one-to-one correspondence with a sounding reference signal (SRS) resource index.

7. The method of claim 1, wherein transmitting, if the CO is shareable, the PUSCH transmission comprises switching from a first channel access procedure to a second channel access procedure different from the first channel access procedure.

8. A user equipment (UE) for wireless communication, comprising:
   at least one memory; and
   at least one processor coupled with the at least one memory and operable to cause the UE to:
      receive control information associated with a channel occupancy (CO) initiated by a base station, wherein the control information indicates whether the CO is shareable;
      determine, based at least in part on the control information, whether the CO is shareable for a physical uplink shared channel (PUSCH) transmission;
      determine, if the CO is shareable, an uplink transmission beam associated with the CO; and
      transmit, if the CO is shareable, the PUSCH transmission with the uplink transmission beam.

9. The UE of claim 8, wherein the at least one processor is further operable to cause the UE to transmit the PUSCH transmission based on additional control information for the PUSCH transmission different from the control information associated with the CO if the CO is not shareable.

10. The UE of claim 8, wherein, if the control information indicates the CO is shareable, the control information further includes additional control information indicating the uplink transmission beam associated with the CO.

11. The UE of claim 10, wherein the control information is received in a group common-physical downlink control channel (GC-PDCCH), and the additional control information is received by high-layer signaling.

12. The UE of claim 8, wherein the uplink transmission beam has a one-to-one correspondence with a sounding reference signal (SRS) resource index.

13. The UE of claim 8, wherein, to transmit, if the CO is shareable, the PUSCH transmission, the at least one processor is further operable to cause the UE to switch from a first channel access procedure to a second channel access procedure different from the first channel access procedure.

14. A base station for wireless communication, comprising:
   at least one memory; and
   at least one processor coupled with the at least one memory and operable to cause the base station to:
      transmit control information associated with a channel occupancy (CO), wherein the control information indicates whether the CO is shareable for a physical uplink shared channel (PUSCH) transmission; and receive, if the CO is shareable, the PUSCH transmission with a reception beam corresponding to an uplink transmission beam associated with the CO.

15. The base station of claim 14, wherein the PUSCH transmission is received based on additional control information for the PUSCH transmission different from the control information associated with the CO if the CO is not shareable.

16. The base station of claim 14, wherein the control information is transmitted in a group common-physical downlink control channel (GC-PDCCH) or a medium access control-control element (MAC-CE).

17. The base station of claim 14, wherein, if the control information indicates the CO is shareable, the control information further includes additional control information indicating the uplink transmission beam associated with the CO.

18. The base station of claim 17, wherein the control information is transmitted in a group common-physical downlink control channel (GC-PDCCH), and the additional control information is transmitted by high-layer signaling.

19. The base station of claim 14, wherein the uplink transmission beam has a one-to-one correspondence with a sounding reference signal (SRS) resource index.

20. A processor for wireless communication, comprising:
at least one controller coupled with at least one memory and operable to cause the processor to:
receive control information associated with a channel occupancy (CO) initiated by a base station, wherein the control information indicates whether the CO is shareable;
determine, based at least in part on the control information, whether the CO is shareable for a physical uplink shared channel (PUSCH) transmission;
determine, if the CO is shareable, an uplink transmission beam associated with the CO; and
transmit, if the CO is shareable, the PUSCH transmission with the uplink transmission beam.

\* \* \* \* \*